United States Patent [19]

Maekawa

[11] Patent Number: 5,530,771
[45] Date of Patent: Jun. 25, 1996

[54] IMAGE TRACKING DEVICE AND IMAGE TRACKING METHOD

[75] Inventor: Hiroko Maekawa, Himeji, Japan

[73] Assignee: Mitsubishi Denki Kabushiki Kaisha, Tokyo, Japan

[21] Appl. No.: 351,143

[22] Filed: Nov. 30, 1994

Related U.S. Application Data

[63] Continuation of Ser. No. 111,855, Aug. 26, 1993, abandoned.

[30] Foreign Application Priority Data

Sep. 16, 1992 [JP] Japan .................................. 4-246315

[51] Int. Cl.⁶ .............................. H04N 5/225; B60Q 1/00
[52] U.S. Cl. .......................... 382/103; 382/104; 382/106; 340/435; 340/437; 348/169
[58] Field of Search .................................. 382/1, 48, 100, 382/104, 106, 103; 348/169–171; 340/435, 437; 364/516; H04N 5/225

[56] References Cited

U.S. PATENT DOCUMENTS

| | | | |
|---|---|---|---|
| 4,644,397 | 2/1987 | Roy et al. | 358/126 |
| 5,023,712 | 6/1991 | Kajiwara | 358/105 |
| 5,168,355 | 12/1992 | Asayama | 358/105 |
| 5,177,462 | 1/1993 | Kajiwara | 340/435 |
| 5,214,408 | 5/1993 | Asayama | 340/435 |
| 5,216,408 | 6/1993 | Shirakawa | 340/435 |
| 5,243,418 | 9/1993 | Kuno et al. | 358/108 |
| 5,257,022 | 10/1993 | Irie | 340/988 |

FOREIGN PATENT DOCUMENTS

| | | |
|---|---|---|
| 46363 | 9/1988 | Japan . |
| 232511 | 9/1990 | Japan . |

OTHER PUBLICATIONS

Kutami et al, "Visual Navigation of Autonomous On–Road Vehicle" 1990 175–180.
Ulmer "VITA–An Autonomous Road Vehicle . . ." May 1992 pp. 36–41.

*Primary Examiner*—Leo Boudreau
*Assistant Examiner*—Chris Kelley
*Attorney, Agent, or Firm*—Sughrue, Mion, Zinn, Macpeak & Seas

[57] ABSTRACT

An image tracking device comprising: an image taking means for taking an image in front of a vehicle and outputting an image signal; a memory for memorizing the image signal from the image taking means; and a tracking means for tracking a plurality of vehicles by discerning the plurality of vehicles in a monitoring region which is set with respect to the image signal memorized in the memory.

3 Claims, 7 Drawing Sheets

21: Monitoring region

Horizontal position on image

IMAGE TRACKING DEVICE AND IMAGE TRACKING METHOD

This is a Continuation of application Ser. No. 08/111,855 filed Aug. 26, 1993, now abandoned.

BACKGROUND OF THE INVENTION

1. Field of the Invention

The present invention relates to an image tracking device which is preferably utilized in a system handling a moving situation of a vehicle in its running direction, such as an automatic tracking system, an environment recognition system and the like.

2. Discussion of Background

A device which employs an image sensor has conventionally been well known as an image tracking device. FIG. 11 is a block diagram showing an example of an image tracking device. In FIG. 11, a numeral 1 designates a lens and 3, an image sensor which is disposed apart from the lens 1 by a focal length of f, wherein an optical system (image tracking means) is constructed by the lens 1 and the image sensor 3. A numeral 6 designates an A/D converter, 8 and 8', memories, 10, a CPU, 12, a window forming device and 13, a window setting switch.

In this image tracking device, an image of an object 5 is formed on the image sensor 3 by the lens 1. An image signal provided by the image sensor 3 is converted into a digital signal by the A/D converter 6, and is stored in the memories 8 and 8'. At this occasion, the image signal is alternately stored to the memories 8 and 8'. The image signals stored in the memories 8 and 8' are electrically superposed by successively shifting them, with respect to a tracking window which is previously set for the object 5 through the window setting switch 13. A new tracking window is set with respect to an image which agrees the most with a preceding image.

In this way, the tracking window is automatically renewed, that is, the tracking window is automatically moved thereby performing the tracking of the object 5. A detailed explanation has been given to a method of achieving the tracking function in Japanese Unexamined Patent Publication No. 195916/1991, and therefore, the explanation thereof will be omitted in this specification.

It is possible to apply this image tracking device to an automatic tracking system, wherein a tracked vehicle is determined and is automatically tracked. In this case, it is necessary to constantly monitor in the running direction, and to provide safety against an unexpected appearance of a vehicle other than the tracked vehicle due to its cutting-in, change of lane and the like. For instance, in case wherein a cut-in vehicle comes into view, the safety is provided by releasing the automatic tracking upon the detection of the cut-in vehicle, or the like.

However, in the above automatic tracking system, when the monitoring in the running direction is performed by employing an obstacle sensor such as a laser radar, it is difficult to differentiate the vehicle from the background, and therefore, the monitoring in the running direction can not be performed with certainty.

SUMMARY OF THE INVENTION

It is an object of the present invention to solve the above problem and to provide an image tracking device capable of performing the monitoring in the running direction with certainty, without employing an obstacle sensor for a short distance, when the image tracking device is applied to an automatic tracking system, an environment recognition system and the like.

According to a first aspect of the present invention, there is provided an image tracking device comprising:

an image taking means for taking an image in front of a vehicle and outputting an image signal;

a memory for memorizing the image signal from the image taking means; and a tracking means for tracking a plurality of vehicles by discerning the plurality of vehicles in a monitoring region which is set with respect to the image signal memorized in the memory.

According to a second aspect of the present invention, there is provided a method of tracking an image having an image taking means for taking an image in front of a vehicle and outputting an image signal and a memory for memorizing the image signal from the image taking means comprising the steps of:

setting a monitoring region with respect to the image signal memorized in the memory;

setting a tracking window with respect to a tracked vehicle in the monitoring region and tracking the tracked vehicle;

setting a monitoring window with respect to a vehicle which is different from the tracked vehicle in the monitoring region other than the tracking window and tracking the vehicle; and monitoring in a running direction based on motions of the monitoring window and the tracking window.

According to the first aspect of the present invention, it is possible to perceive the positions, the moving situations and the like of the respective vehicles, while tracking a plurality of vehicles in the monitoring region by discerning them.

According to the second aspect of the present invention, the monitoring in the running direction is performed based on the motions of the monitoring window and the tracking window, while tracking the tracked vehicle and the vehicle which is different from the tracked vehicle in the monitoring region.

DETAILED DESCRIPTION OF THE PREFERRED EMBODIMENT

A detailed explanation will be given to the present invention based on examples as follows.

Figure 1:
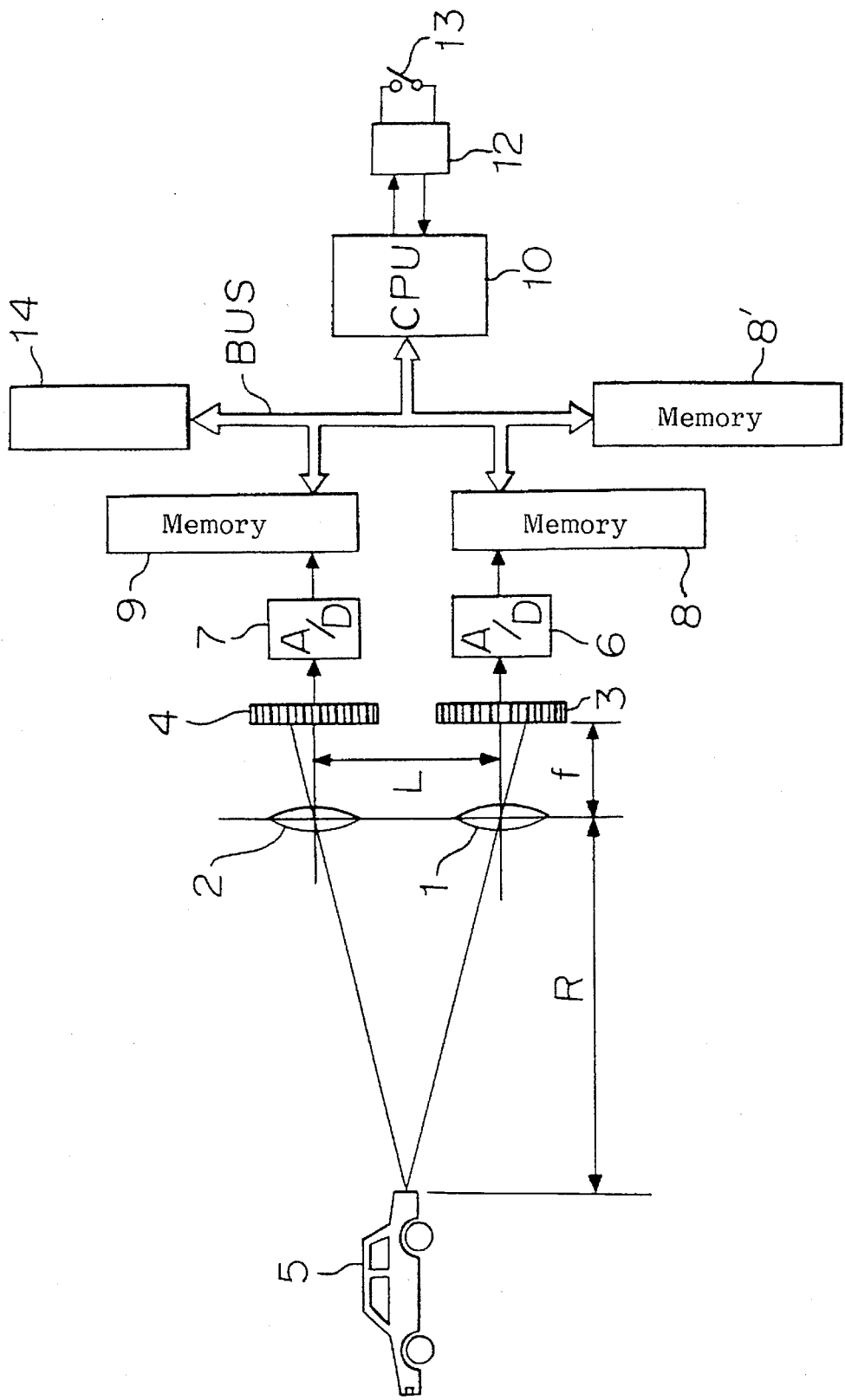
FIG. 1 is a block diagram showing an example of an image tracking device according to the present invention.
Figure 11:
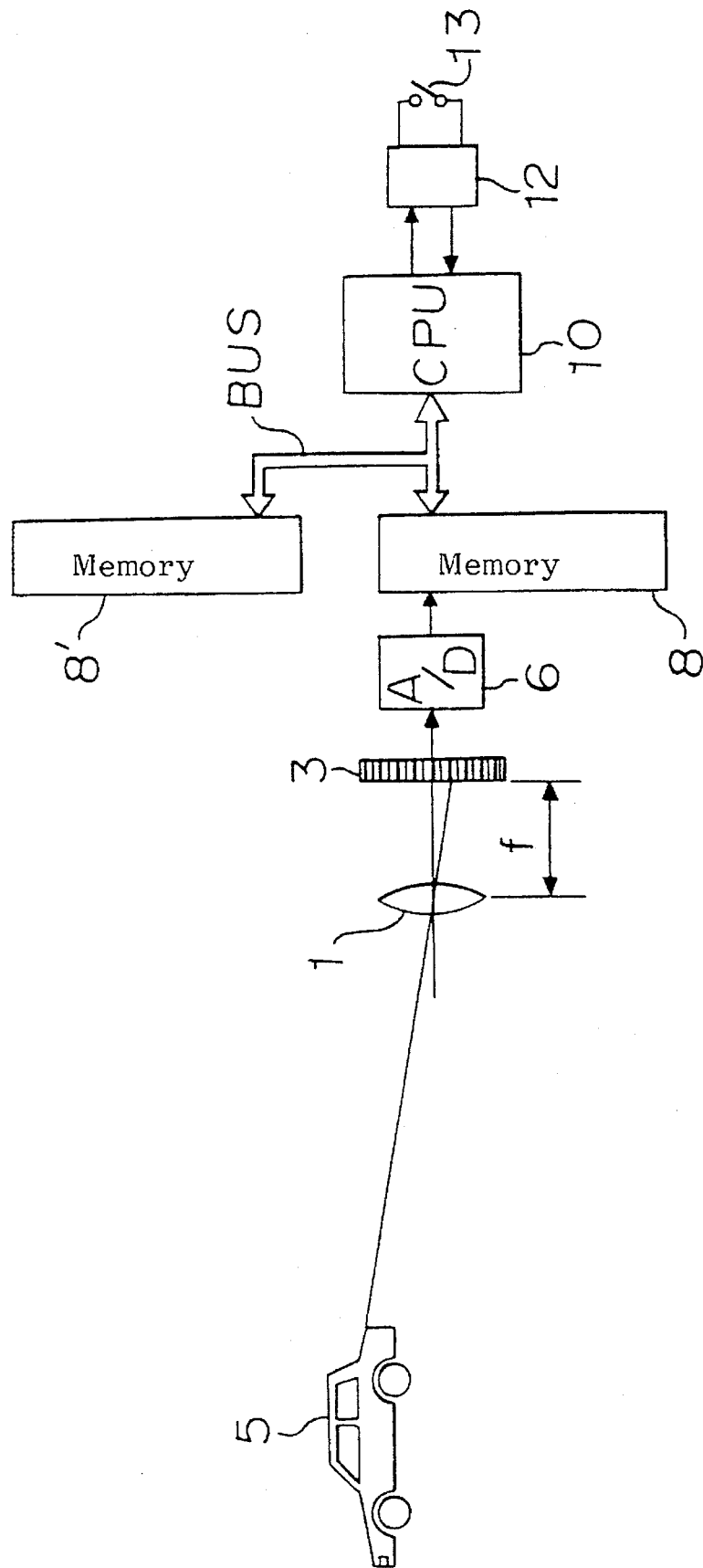
FIG. 11 is a block diagram showing an example of a conventional image tracking device.

FIG. 1 is a block diagram showing an example of an image tracking device of this invention. In FIG. 1, the notations the same with those in FIG. 11 designate the same or the equivalent constituent elements.

In this example, in addition to an optical system (first optical system) constructed by the lens 1 and the image sensor 3, an optical system (second optical system) constructed by a lens 2 and an image sensor 4, is provided. Further, with respect to the second optical system, an A/D converter 7 and a memory 9 are provided. A display device 14 is connected to a bus line BUS. The first optical system and the second optical system are provided apart from each other by a base line length L, and the image sensor 4 is disposed apart from the lens 2 by the focal length of f.

In this image tracking device, images of the object 5 apart from the lens face by a distance R, are formed on the image sensors 3 and 4 by the lenses 1 and 2. Image signals provided by the image sensors 3 and 4 are converted into digital signals through the A/D converters 6 and 7 at a predetermined sampling period, which are stored in memories 8 and 9. The image signal stored in the memory 8 is sent to the CPU 10 and the display device 14. The image signal stored in the memory 9 is sent to the CPU 10. The CPU 10 calculates an inter-vehicle distance by a triangulation method, to be mentioned later, after an image processing. The display device 14 displays the inter-vehicle distance R calculated by the CPU 10, along with the transmitted image signal. Further, the CPU 10 have the window memory 8' memorize a content of the memory 8, to calculate the image signal sequentially, or over time in renewing windows.

Figure 10:
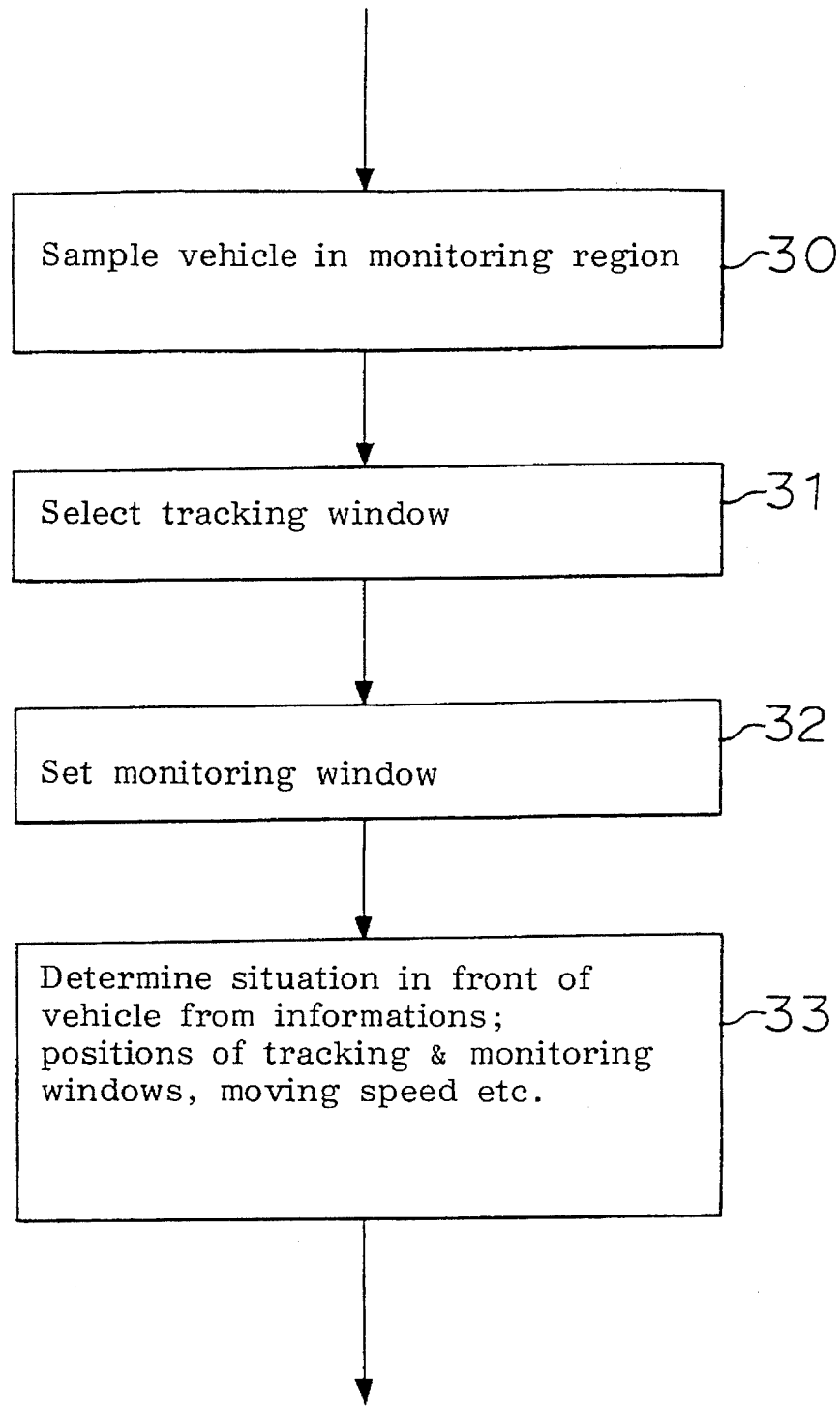
FIG. 10 is a flowchart for explaining a processing operation of a CPU which is specific to this example.

Next, an explanation will be given to a processing operation of the CPU 10 which is specific to this example, in reference to a flowchart shown in FIG. 10.

Figure 2:
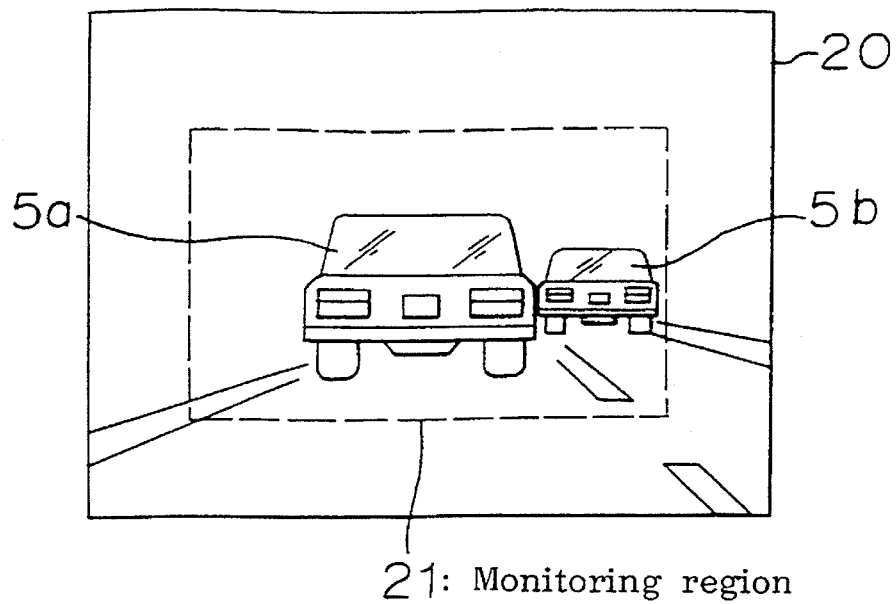
FIG. 2 is a diagram showing a situation wherein a monitoring region is set with respect to an image signal stored in a memory in the image tracking device shown in FIG. 1.
Figure 3:
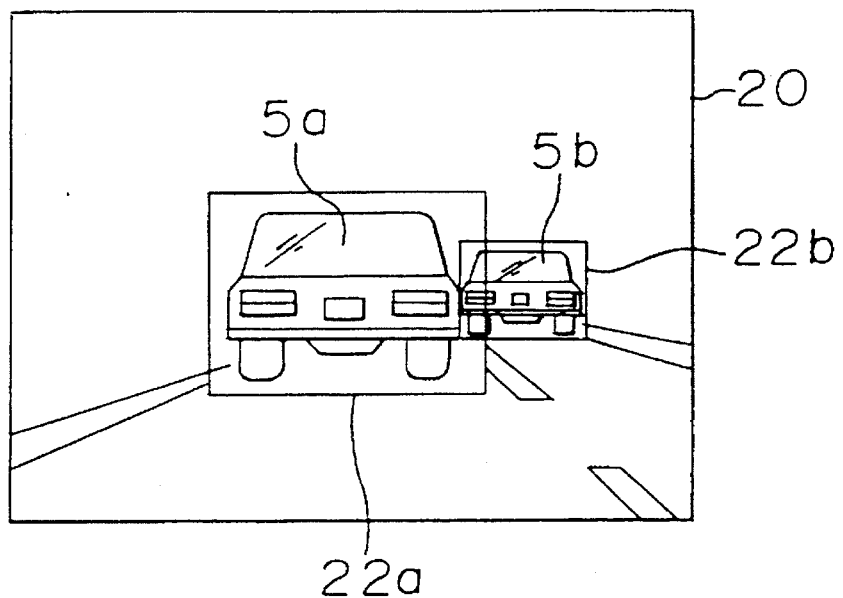
FIG. 3 is a diagram showing a situation wherein windows are set with respect to vehicles sampled in the monitoring region shown in FIG. 2.

In Step 30, the CPU 10 sets a monitoring region 21 with respect to the image signal stored in the memory 8 (or memory 9), as shown in FIG. 2. That is to say, the CPU 10 sets the monitoring region 21 with respect to an image 20. Further, the CPU 10 samples vehicles 5a and 5b in the monitoring region 21, and sets windows 22a and 22b (see FIG. 3).

In this sampling of vehicles, various methods, such as a method utilizing a horizontal symmetry of vehicle (Computer Vision 1985, 37–4), a method utilizing a shape sampling filter (Japanese Unexamined Patent Publication No. 45898/1991) and the like, can be employed.

Figure 4:
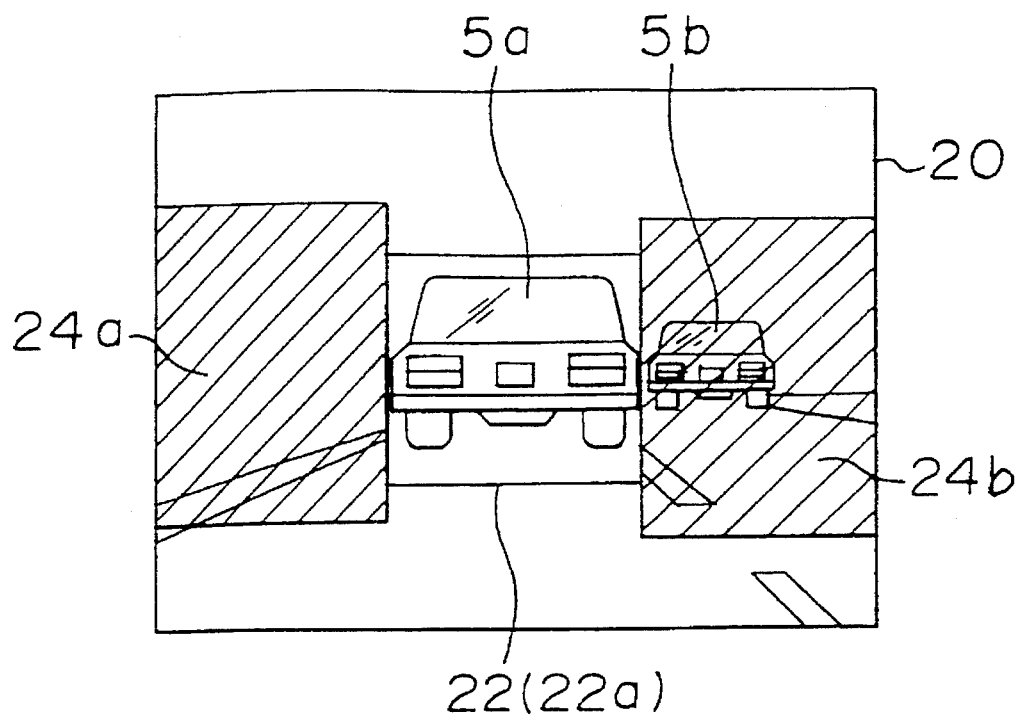
FIG. 4 is a diagram showing a situation wherein a tracking window is selected among the respective windows shown in in FIG. 3.

Next, in Step 31, the CPU 10 selects a tracking window from the windows 22a and 22b. In this case, the window 22a is selected as the tracking window 22, as shown in FIG. 4.

In this example, the selection of the tracking window 22 is performed as follows. The inter-vehicle distance is provided by the triangulation method, from a deviation n between the image signals from the first optical system and the second optical system. The inter-vehicle distances R to respective vehicles are provided by the following equation (1). A window having a shorter inter-vehicle distance R is determined to be the tracking window 22. The details of measuring process in this case is disclosed in Japanese Examined Patent Publication No. 46363/1988, and will be omitted in this specification.

$$R = (f \times L)/n \qquad (1)$$

Further, the selection of the tracking window 22 may not be performed by the above method, and a width of a vehicle in each window may be a criterion. That is to say, a window wherein a vehicle having the largest width of vehicle is present, may be selected as the tracking window 22. Further, the tracking window 22 may be selected by employing both conditions of the shorter distance and the width of vehicle.

Figure 5:
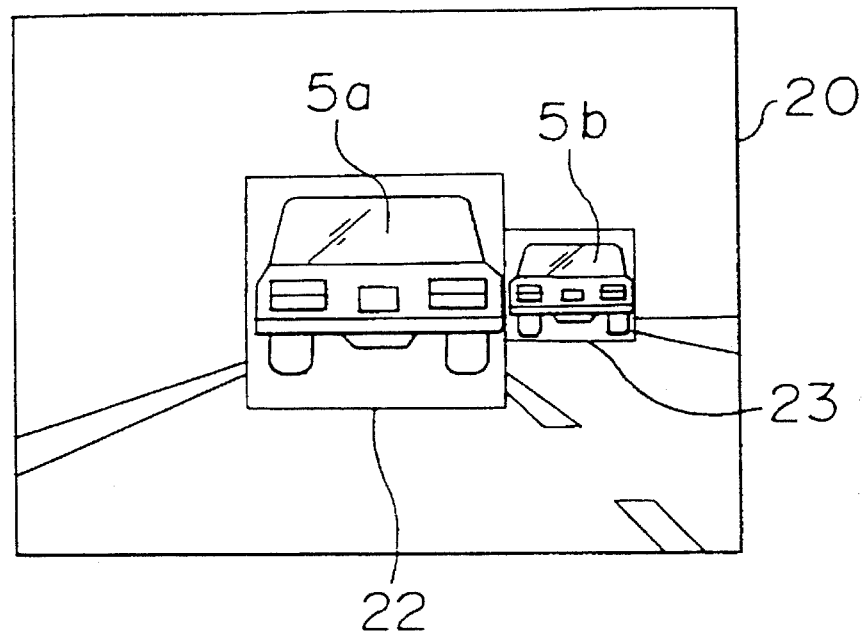
FIG. 5 is a diagram showing a situation wherein a monitoring window is set with respect to a vehicle sampled from the monitoring region, other than the tracking window shown in FIG. 4.

Next, in Step 32, the CPU 10 classifies the monitoring region other than the tracking window 22 into those of 24a and 24b, and sets a monitoring window 23 by discerning a vehicle in the monitoring regions 24a and 24b (see FIG. 5).

Further, in Step 33, the CPU 10 compares the current data with the previous result by employing informations of horizontal positions, distances, sizes, moving speeds and the like of the tracking window 22 and the monitoring window 23, and determines motions of the tracked vehicle 5a and a vehicle 5b other than the tracked vehicle.

Figure 6:
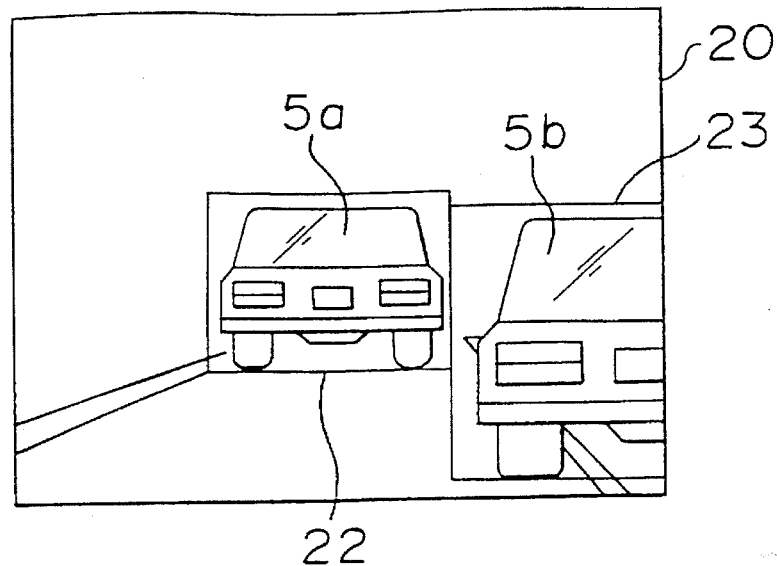
FIG. 6 is a diagram showing moving positions of a tracking window and a monitoring window in a situation wherein a vehicle other than the tracked vehicle cuts in between the tracking vehicle and the image tracking device.
Figure 7:
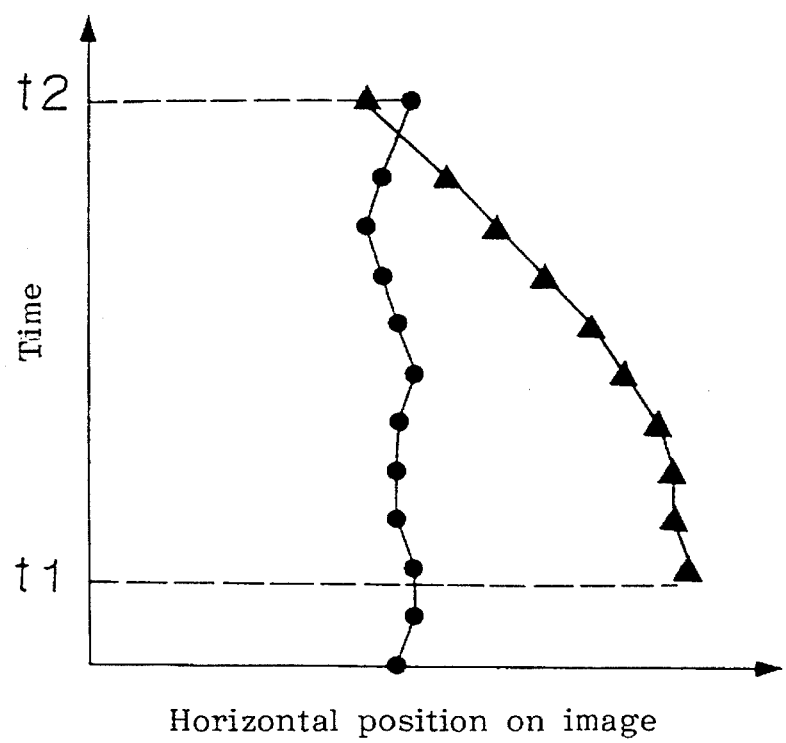
FIG. 7 is a diagram showing moving situations of the tracking window and the monitoring window sequentially, or over time.

An explanation will be given to an example of the determination in Step 33, by employing FIGS. 6 and 7. In FIG. 7, the abscissa is a horizontal position on image 20, and the ordinate, time. Black circles and black triangles in FIG. 7 indicate centers in the horizontal direction of the tracking window 22 and the monitoring window 23, respectively. The moving situations of the both windows 22 and 23 can sequentially be known from FIG. 7. According to FIG. 7, the vehicle 5b comes into view at a time point t1, and the vehicle 5b cuts in between the image tracking device and the tracking vehicle 5a at a time point t2, as shown in FIG. 6. In such a case, in this example, the automatic tracking with respect to the tracking vehicle 5a is released and the driver is informed of the presence of the cut-in vehicle by an alarm or a display. In this occasion, the situation wherein the vehicle 5b cuts in between the image tracking device and the tracking vehicle 5a, is determined based on the motions of the monitoring window 23 and the tracking window 22, at a time point wherein the monitoring window 23 begins overlapping with the tracking window 22, or when a total of the tracking window 23 overlaps with the tracking window 22, or when the size of the vehicle in the monitoring window 23 becomes larger than that of the vehicle in the tracking window 22 or the like.

Figure 8:
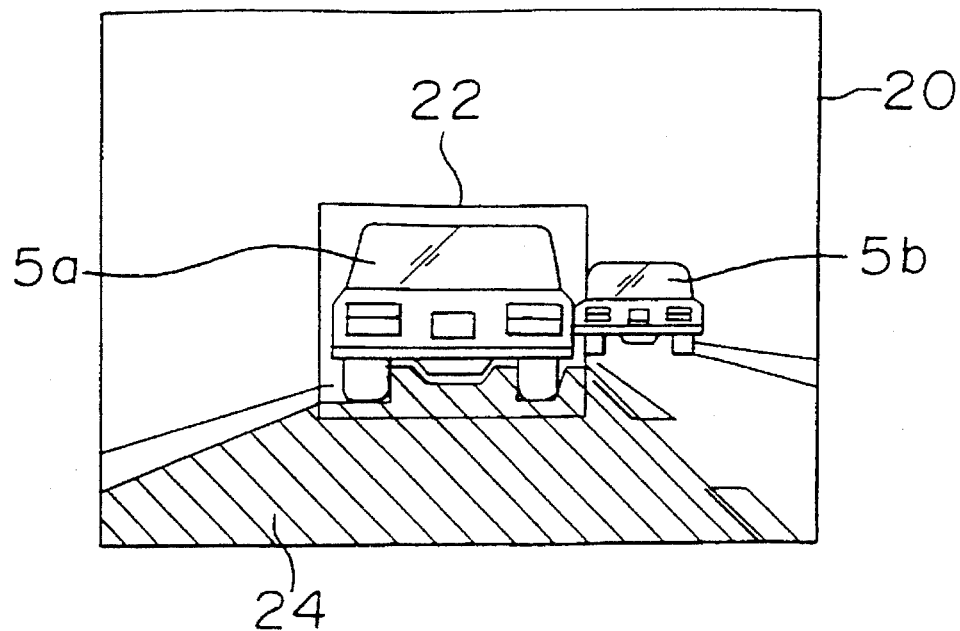
FIG. 8 is a diagram showing a situation wherein a tracking window is set when a monitoring region is determined restricting to a lane of a driving vehicle, in comparison with FIG. 5.
Figure 9:
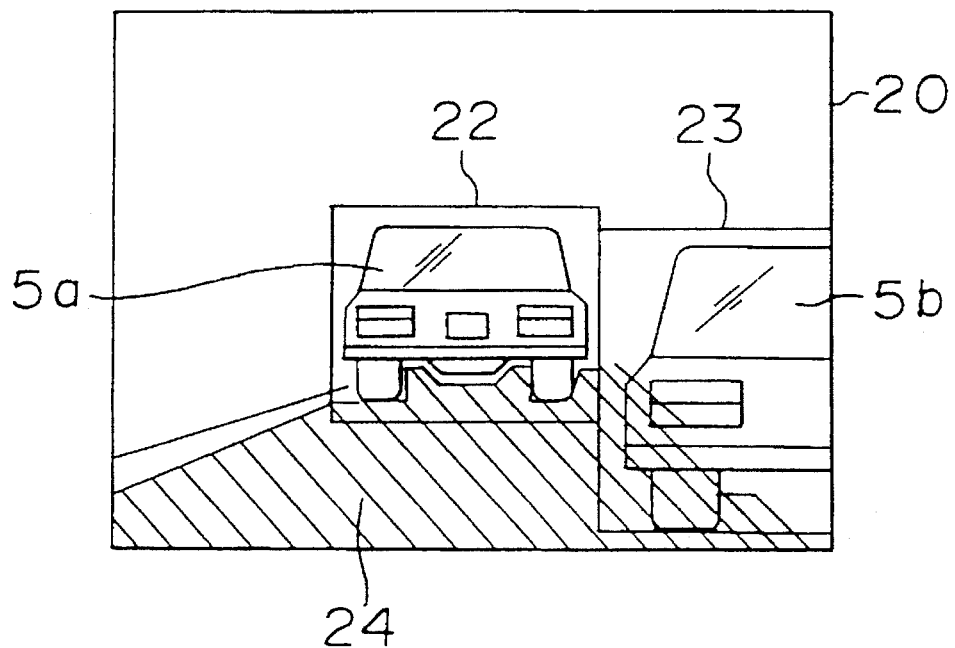
FIG. 9 is a diagram showing a situation wherein a tracking window and a monitoring window are set when a monitoring region is determined restricting to a lane of a driving vehicle, in comparison with FIG. 6.

Further, the monitoring area 21 in Step 30 may be determined in accordance with a system to which this invention is applied. For instance, the monitoring region 21 is determined restricting to a vehicle in a lane of a driving vehicle, whereby the monitoring in the running direction is performed. That is to say, a vehicle in a contiguous lane may be ignored (see FIG. 8), and the monitoring may be performed with respect to only a vehicle which cuts in the lane of the driving vehicle (see FIG. 9). In this occasion, the lane of the driving vehicle is recognized by sampling out white lines on the road. Further, the method of recognizing white lines is well known, which is disclosed, for instance, in documents of a Research Committee of the Association of Pattern Measurement (Feb. 16, 1990) or the like.

Further, the monitoring information of a preceding vehicle in Step 33, may be determined not only by horizontal positions, distances, sizes, moving speeds and the like of the tracking window 22 and the monitoring window 23, but in accordance with a system to which this invention is applied. For instance, there may be a device wherein an approaching speed of a cut-in vehicle is detected by incorporating informations of a speed of the driving vehicle, a relative speed between the driving vehicle and the tracking vehicle and the like, and the degree of danger is informed to the system side.

Further, the distance information (inter-vehicle distance) may be provided by employing an ultrasonic sensor and a laser radar, without depending on the triangulation method as in this example.

As stated above, according to the first aspect of the present invention, the positions, the moving situations and the like of the respective vehicles can be perceived while tracking and recognizing a plurality of vehicles in the monitoring region. Further, according to the second aspect of the present invention, the monitoring in the running direction is performed based on the motions of the tracking window and the monitoring window while tracking the tracked vehicle and the vehicle which is different from the tracked vehicle, in the monitoring region. Accordingly, the monitoring in the running direction can be performed with certainly, without employing an obstacle sensor for a short distance, when this invention is applied to an automatic tracking system, and environment recognition system and the like.

What is claimed is:

1. An image tracking device comprising:

a video camera for taking an image in front of a vehicle:

a memory for memorizing an image signal outputted by the video camera;

image processing means for recognizing and tracking a plurality of vehicles by processing the image signal memorized in the memory;

image display means for displaying the image outputted by the video camera and data outputted by the image processing means;

white line sampling means for sampling a white line of a road;

means for determining, based on the white line data sampled by the white line sampling means, which one of said plurality of vehicles running within a range of a lane of a driving vehicle is to be tracked as a target vehicle, and which one of said plurality of vehicles is to be tracked as a cut-in vehicle running between the target vehicle and the driving vehicle; and means for releasing a tracking window when at least a portion of another vehicle overlaps the target vehicle, whereby the overlapping vehicle may then be tracked as the target vehicle.

2. The image tracking device according to claim 1, further comprising an inter-vehicle distance sensor and a means for sampling and tracking the target vehicle running within the range of the lane of the driving vehicle and the cut-in vehicle running between the target vehicle and the driving vehicle based on the white line data and a distance data provided by the inter-vehicle distance sensor.

3. The image tracking device according to claim 1, further comprising means for informing a driver by an alarm or a display when the tracking window is released.

* * * * *